US012745721B2

(12) United States Patent
Marder-Eppstein et al.

(10) Patent No.: US 12,745,721 B2
(45) Date of Patent: Sep. 29, 2026

(54) HIGH DENSITY GROW SPACE AUTOMATION WITH MOBILE ROBOTS

(71) Applicant: Hippo Harvest Inc., San Francisco, CA (US)

(72) Inventors: Eitan Marder-Eppstein, San Francisco, CA (US); Wim Meeussen, Redwood City, CA (US)

(73) Assignee: Hippo Harvest Inc., San Francisco, CA (US)

( * ) Notice: Subject to any disclaimer, the term of this patent is extended or adjusted under 35 U.S.C. 154(b) by 674 days.

(21) Appl. No.: 18/177,609

(22) Filed: Mar. 2, 2023

(65) Prior Publication Data

US 2023/0276757 A1 Sep. 7, 2023

Related U.S. Application Data

(60) Provisional application No. 63/268,782, filed on Mar. 2, 2022.

(51) Int. Cl.

| | |
|---|---|
| ***A01G 31/02*** | (2006.01) |
| ***A01G 9/14*** | (2006.01) |
| ***A01G 31/06*** | (2006.01) |
| ***G05D 1/698*** | (2024.01) |
| ***G05D 105/20*** | (2024.01) |
| ***G05D 107/20*** | (2024.01) |
| ***G05D 109/10*** | (2024.01) |

(52) U.S. Cl.

CPC ............. *A01G 31/02* (2013.01); *A01G 9/143* (2013.01); *A01G 31/06* (2013.01); *G05D 1/6987* (2024.01); *G05D 2105/20* (2024.01); *G05D 2107/21* (2024.01); *G05D 2109/14* (2024.01)

(58) Field of Classification Search

CPC ........ A01G 31/02; A01G 31/06; A01G 9/143; G05D 1/6987; G05D 2105/20; G05D 2107/21; G05D 2109/14

See application file for complete search history.

(56) References Cited

U.S. PATENT DOCUMENTS

2004/0040209 A1* 3/2004 Layt ........................ A01G 9/028 47/86

2005/0081441 A1* 4/2005 Mantovani ............. A01G 9/024 47/67

(Continued)

FOREIGN PATENT DOCUMENTS

WO 2019222860 A1 11/2019

*Primary Examiner* — Ernesto A Suarez
*Assistant Examiner* — Laurence R Brothers

(57) ABSTRACT

A grow space automation system. The system includes growing plants in grow modules that are individually moveable. One or more mobile robots can navigate around a grow space, bring any grow module from one location to another, and perform grow space operations. The grow space operations can be automated using robot-based actuation of automation fixtures. Interactions with plants can also be achieved via robot attachments. The grow space is configured to allow maximum grow tray density while still maintaining traveling pathways for the mobile robots. Multiple mobile robots move about the grow space in their respective travel zones in coordination with one another via navigation planners. Multi-robot coordination can also be achieved using a central server. Local leveling of grow trays can be achieved via laser levels.

18 Claims, 17 Drawing Sheets

(56) References Cited

U.S. PATENT DOCUMENTS

| | | | | |
|---|---|---|---|---|
| 2005/0234592 | A1 * | 10/2005 | McGee | G05D 1/027 700/245 |
| 2016/0101940 | A1 * | 4/2016 | Grinnell | G05D 1/0289 700/218 |
| 2017/0267452 | A1 * | 9/2017 | Goren | B65G 1/0492 |
| 2018/0146618 | A1 * | 5/2018 | Elazary | A01D 46/30 |
| 2018/0365137 | A1 | 12/2018 | Millar | |
| 2018/0368344 | A1 | 12/2018 | Marshall | |
| 2019/0150375 | A1 * | 5/2019 | Miyahara | A01G 31/06 |
| 2020/0150655 | A1 * | 5/2020 | Artes | G05D 1/0016 |
| 2021/0090001 | A1 * | 3/2021 | Glass | G06Q 10/08 |

* cited by examiner

HIGH DENSITY GROW SPACE AUTOMATION WITH MOBILE ROBOTS

CROSS-REFERENCE TO RELATED APPLICATIONS

This application claims priority to Provisional U.S. Patent Application No. 63/268,782, titled "HIGH DENSITY GROW SPACE AUTOMATION WITH MOBILE ROBOTS," filed on Mar. 2, 2022, by Eitan Marder-Eppstein et al., which is incorporated herein by reference in its entirety and for all purposes.

TECHNICAL FIELD

The present disclosure relates generally to agriculture, and more specifically to grow space systems.

DESCRIPTION OF RELATED ART

Agriculture has been a staple for mankind, dating back to as early as 10,000 B.C. Through the centuries, farming has slowly but steadily evolved to become more efficient. Traditionally, farming occurred outdoors in soil. However, such traditional farming required vast amounts of space and results were often heavily dependent upon weather. With the introduction of greenhouses, crops became somewhat shielded from the outside elements, but crops grown in the ground still required a vast amount of space. In addition, ground farming required farmers to traverse the vast amount of space in order to provide care to all the crops. Further, when growing in soil, a farmer needs to be very experienced to know exactly how much water to feed the plant. Too much and the plant will be unable to access oxygen; too little and the plant will lose the ability to transport nutrients, which are typically moved into the roots while in solution.

Two of the most common errors when growing are overwatering and underwatering. With the introduction of hydroponics, the two most common errors are eliminated. Hydroponics prevents underwatering from occurring by making large amounts of water available to the plant. Hydroponics prevents overwatering by draining away, recirculating, or actively aerating any unused water, thus, eliminating anoxic conditions.

Operating a hydroponic grow space today comes with a number of challenges that place significant burdens on farmers and leads to increased costs and/or inefficient food production. For example, current hydroponic systems have high manual labor costs for maintenance of crops. If farmers want to reduce labor costs, they can purchase traditional manufacturing equipment, which is very expensive. Thus, there is a need for grow space automation that reduces labor costs and increases efficiency.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure relates to a grow space automation system. The system comprises a grow space including one or more grow trays and one or more grow tray supports. The system also includes a mobile robot configured to perform transport or task automation within the grow space, the mobile robot including one or more sensors, a mobility mechanism, a processor, memory; and a lift, wherein the lift is configured to allow the mobile robot to transport grow trays above or below a stationary height of the one or more grow trays.

In some embodiments, the lift is further configured to allow transport of the grow trays without colliding with any other grow trays. In some embodiments, the grow space is configured such that the mobile robot travels underneath columns or rows of grow trays without colliding with grow trays or grow tray supports. In some embodiments, each grow tray is spaced apart from another grow tray with a maximum distance D, wherein D is less than the width of any particular grow tray in the plurality of grow trays. In some embodiments, one or more grow tray supports are angled such that the width of a space between two angled grow tray supports on the same grow tray proximate to the grow tray is wider than a width of a space between two angled grow tray supports on the same grow tray distal to the grow tray. In some embodiments, the grow space is configured such that two mobile robots can travel side-by-side in the grow space underneath grow trays, one mobile robot traveling directly underneath the grow trays in a column/row and the other mobile robot traveling in an aisle next to the column/row. In some embodiments, the mobile robot is configured to include an attachment, the attachment being configured to perform tasks above the plurality of grow trays.

Another aspect of the present disclosure relates to a system comprising a grow space. The grow space comprises a plurality of grow trays. Each grow tray is spaced apart from another grow tray with a maximum distance D. D is less than the width of any particular grow tray in the plurality of grow trays. The system also comprises one or more grow tray supports. The one or more grow tray supports are configured such that a mobile robot can navigate below the plurality of grow trays while also performing tasks above the plurality of grow trays without collision. The system also comprises a mobile robot configured to perform transport or task automation within the grow space. The mobile robot includes one or more sensors, a mobility mechanism, a processor, memory, and an attachment. The attachment is configured to perform tasks above the plurality of grow trays.

In some embodiments, the collision refers to a collision between the mobile robot and the one or more grow tray supports. In some embodiments, the collision refers to a collision between the attachment and a grow tray. In some embodiments, the grow space is configured such that mobile robots can travel underneath columns or rows of grow trays without colliding with grow trays or grow tray supports. In some embodiments, one or more grow tray supports are angled such that the width of a space between two angled grow tray supports on the same grow tray proximate to the grow tray is wider than a width of a space between two angled grow tray supports on the same grow tray distal to the grow tray. In some embodiments, the grow space is configured such that two mobile robots can travel side-by-side in the grow space underneath grow trays, one mobile robot traveling directly underneath the grow trays in a column/row and the other mobile robot traveling in a micro-aisle next to the column/row, the micro-aisle having a width that is less than or equal to D. In some embodiments, the one or more grow tray supports a hanging grow tray supports, each hanging grow tray support including one or more grow tray eyes for hanging grow trays.

Yet another aspect of the present disclosure relates to a system comprising a grow space. The grow space includes one or more grow trays, one or more travel zones within the grow space, and a plurality of mobile robots. The mobile robots are configured to perform transport or task automation within the grow space. Each mobile robot includes one or more sensors, a mobility mechanism, a first processor, and a first memory. The first memory stores instructions for implementing a navigation planner and a lock requestor. The navigation planner is configured to compute a path and a list of traversable travel zones for a mobile robot to navigate within the grow space. The lock requestor is configured to request locks on traversable travel zones in a given computed path from a central server. The system also includes a central server configured to manage coordination between mobile robots and travel zones within the grow space. The central server includes a second processor, and a second memory. The second memory stores instructions for implementing a travel zone store and a lock provider. The travel zone store is configured to log locks of travel zones given to mobile robots. The lock provider is configured to manage locks of travel zones to mobile robots.

In some embodiments, at least one mobile robot includes a lift configured to allow transport of the grow trays without colliding with any other grow trays. In some embodiments, the grow space is configured such that at least one mobile robot travels underneath columns or rows of grow trays without colliding with grow trays or grow tray supports. In some embodiments, each grow tray is spaced apart from another grow tray with a maximum distance D, wherein D is less than the width of any particular grow tray in the plurality of grow trays. In some embodiments, the grow space is configured such that two mobile robots can travel side-by-side in the grow space underneath grow trays in two different travel zones, one travel zone being directly underneath the grow trays in a column/row and the other travel zone being an aisle next to the column/row. In some embodiments, at least one mobile robot is configured to include an attachment, the attachment being configured to perform tasks above the plurality of grow trays.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1A:
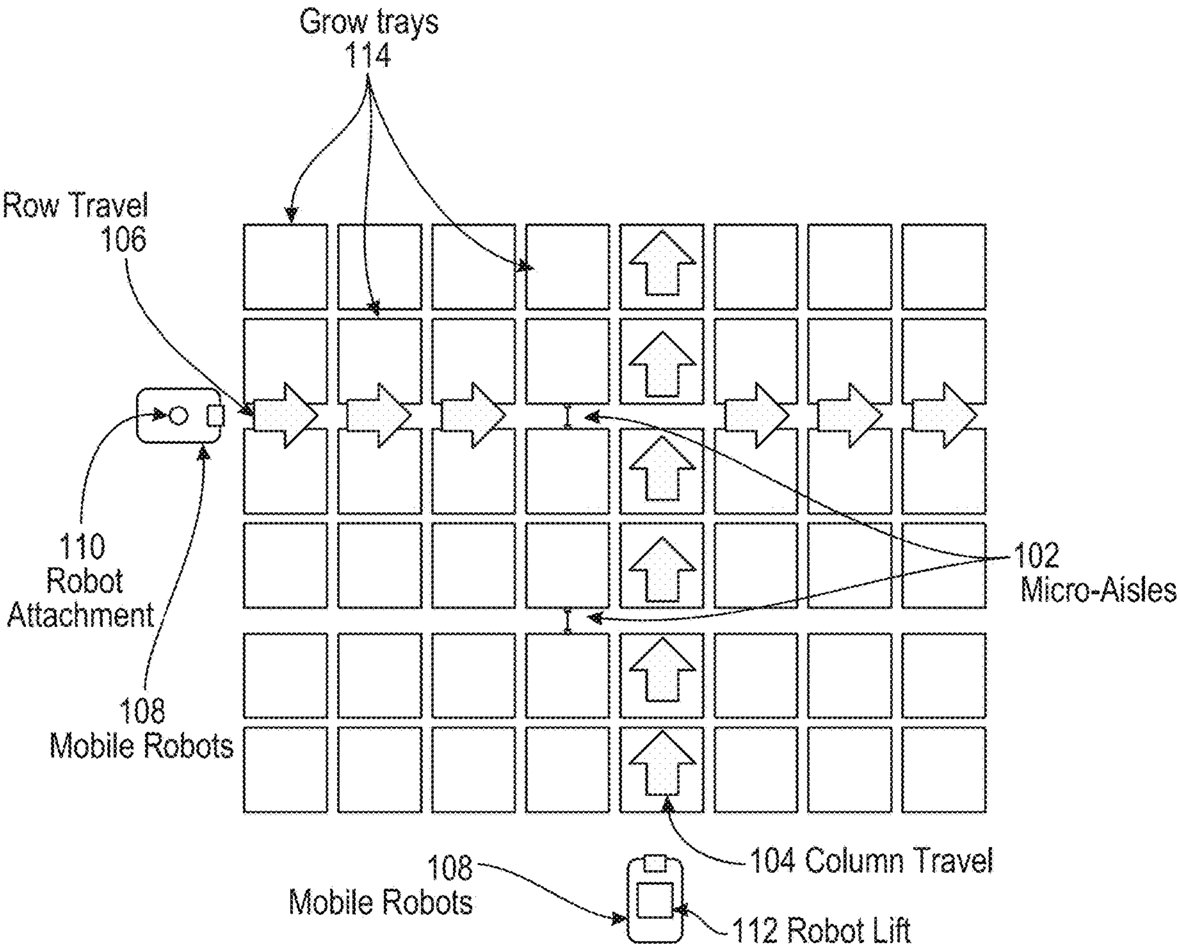
FIGS. 1A-1C illustrate one example of a grow space design, in accordance with one or more embodiments of the present disclosure.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, portions of the techniques of the present disclosure will be described in the context of particular hydroponic grow systems. However, it should be noted that the techniques of the present disclosure apply to a wide variety of different grow systems. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a grow tray in a variety of contexts. However, it will be appreciated that a system can use multiple grow trays while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, plant roots may be connected to nutrient water, but it will be appreciated that a variety of layers, such as grow mediums and buffer mats, may reside between the plant roots and nutrient water. Consequently, a connection does not necessarily mean a direct, unimpeded connection unless otherwise noted.

As mentioned above, current grow systems have many drawbacks. For example, current growing methods are inflexible and tightly coupled to the greenhouse infrastructure. Plants either sit stationary for the duration of their growth cycle or are transported in linear fashion on long conveyors with no ability to access plants anywhere but the beginning or end of a run. This limits current operators from changing the grow climate during different stages of a crop's production, from treating pests in a more targeted/direct fashion at the per plant level instead of spraying, and from leveraging capitally expensive fixed infrastructure (e.g. LED grow lights) as effectively as possible.

In some embodiments, one challenge in designing an effective grow space automation system with mobile robots is ensuring that the robot has easy access to plants throughout the grow space while they sit in place. Since robots travel below grow trays in the system design, any attachment for the robot that sits at or above the height of the tray must remain clear of obstruction. Furthermore, any path taken by the robot must be free of obstacles at ground level meaning that there must be enough clearance between ground-based supports for the robot to travel.

In some embodiments, a potential solution to this problem is to leave aisles that are the width of the robot open in the grow space to allow the robot to pass. However, this solution greatly reduces the density of plants in the grow space which is undesirable as higher densities of plants lead to greater productivity in a grow space. In some embodiments, another solution to this problem is to move grow trays to centralized sensing stations whenever data is required. However, this becomes prohibitive at scale, requiring large fleets of robots to constantly move plants, creating increased risk of pests spreading through the farm, and limiting the frequency at which data can be collected or operations on plants can be performed.

Figure 1B:
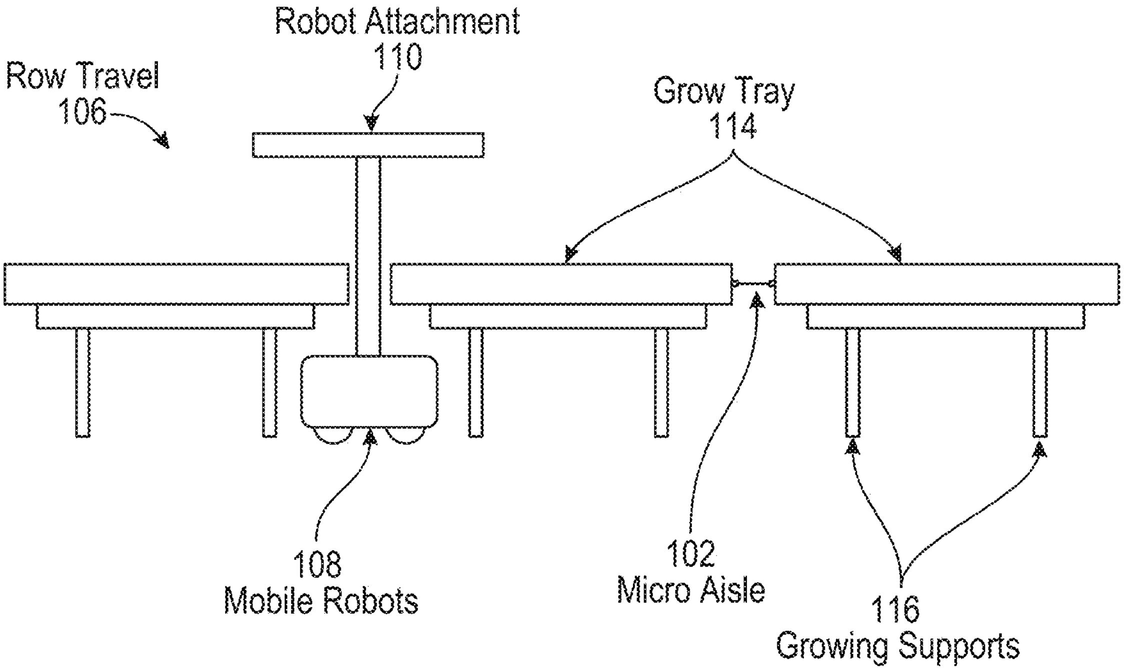
Figure 1C:
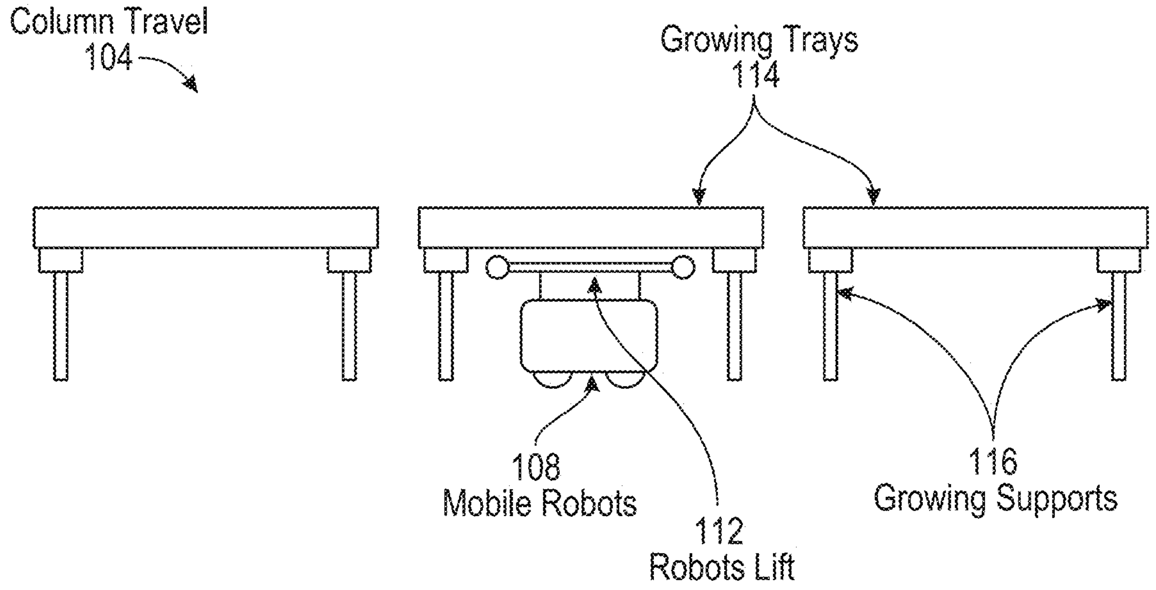

One embodiment shown in FIGS. 1A-1C above addresses these challenges by presenting a design for grow trays and associated support structures that allows a mobile robot to pass unimpeded through a grow space in two dimensions while maintaining very high plant site densities.

As shown in FIGS. 1A-1C, in some embodiments, mobile robots 108 equipped with robot lifts 112 can pass below the center of grow trays 114 while avoiding any contact between the mobile robot 108, robot lift 112, and growing supports. Mobile robots 108 equipped with robot attachments 110 can pass through micro-aisles 102 that are clear from the ground up which allows the robot attachment 110 to move past densely packed grow trays 114 while avoiding collisions. In some embodiments, the growing supports are configured in such a way that they allow enough vertical and horizontal clearance for the mobile robots 108 equipped with robot attachments 110 to pass via row travel 106 through micro-aisles 102 without hitting the grow trays 114. The growing supports 116 are also configured in such a way that they allow enough vertical and horizontal clearance to allow the mobile robots 108 equipped with robot lifts 112 to pass underneath grow trays 114 when traveling in columns within the grow space. In some embodiments, traveling under grow trays occurs horizontally, and micro-aisle travel occurs vertically.

In some embodiments, by designing growing support 116, robot lifts 112, and robot attachments 110 together in this way, a robotic grow space automation system can achieve plant site densities limited only by the width of the robot attachment 110 which is, in practice, a narrow (e.g. 1" diameter) pole. This leads to higher plant site densities than many traditional grow space automation solutions that leave aisles for human access to plants. In the case that human access to a grow tray 114 is required in the system presented in this embodiment, mobile robots 108 equipped with robot lifts 112 can temporarily move grow trays 114 out of a given column in the grow space to allow access for maintenance purposes.

The embodiments presented with reference to FIGS. 1A-1C above provide access to plants within a grow space while still maintaining very high plant site densities. In certain grow spaces, however, structural supports limit a mobile robot's ability to travel in two dimensions. In these scenarios, it is still desirable to be able to access plants while they are stationary in the grow space, but it is not possible to perform one of column or row travel as outlined in FIGS. 1A-1C above.

Figure 2A:
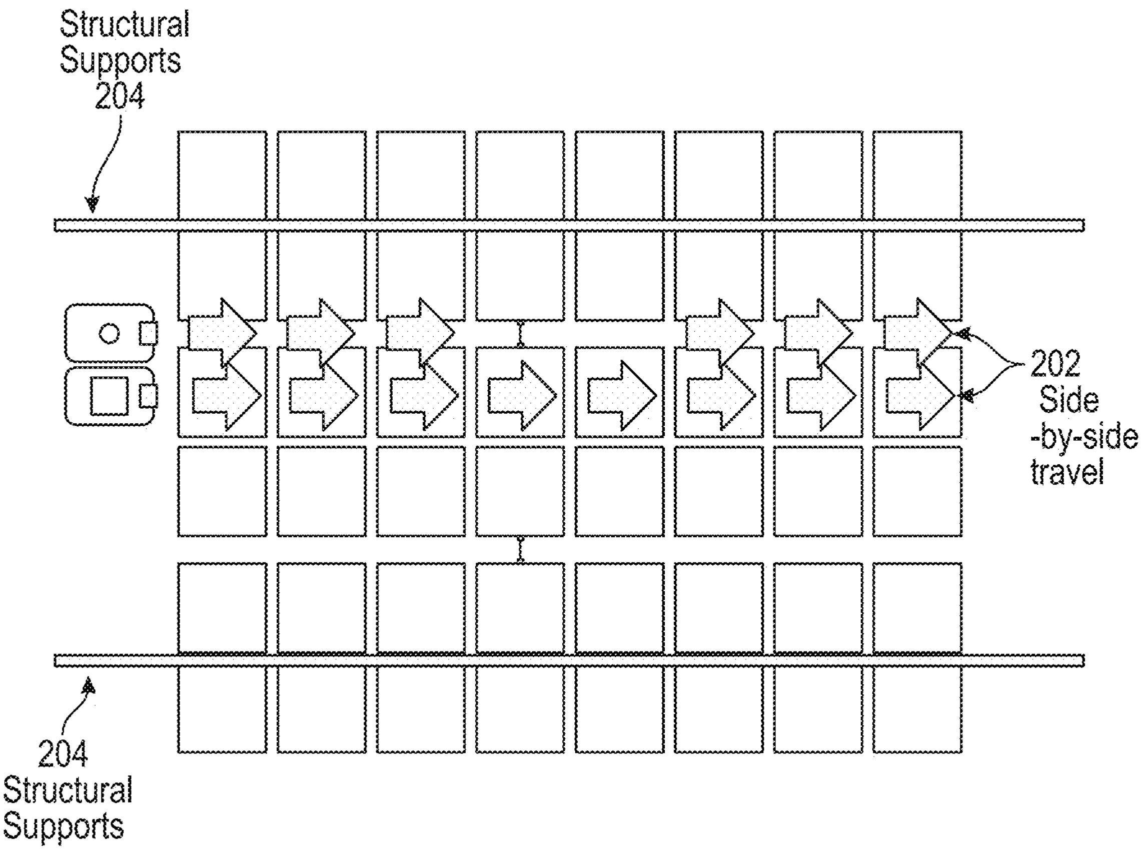
FIGS. 2A-2B illustrate another example of a grow space design, in accordance with one or more embodiments of the present disclosure.
Figure 2B:
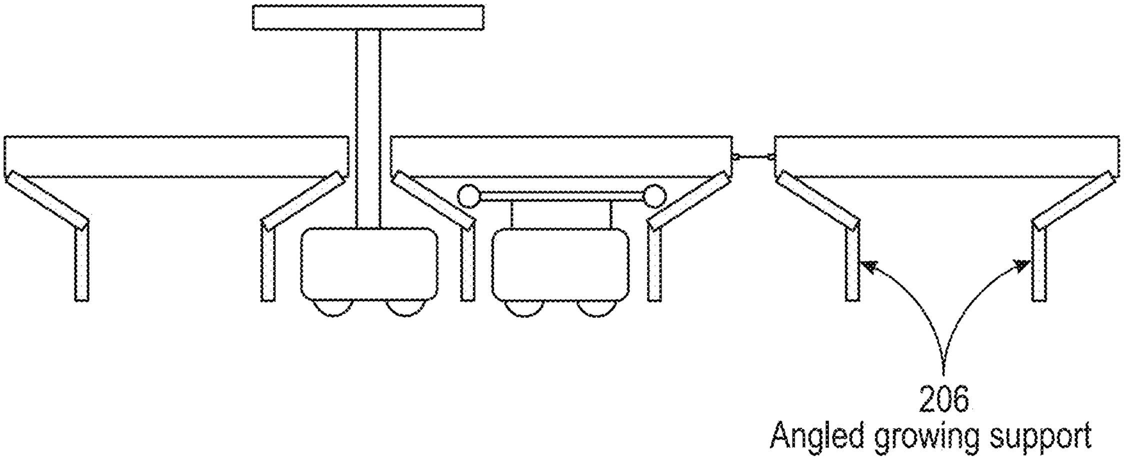

The embodiments presented in FIGS. 2A-2B allow for mobile robots to travel under grow trays directly as well as through micro-aisles to access plants while avoiding column travel and maintaining high plant site densities. In this configuration, structural supports 204 block column travel 104 within a grow space. However, angled growing supports 206 leave enough room for the robot lift 112 to pass while leaving a narrower opening for the robot attachment 110. This works because the width of the mobile robot 108 is significantly less than the width of the robot lift 112 where the width of the robot attachment 110 is less than the width of the mobile robot 108. This configuration with its addition of angled growing supports 206 allows for side-by-side travel 202 of mobile robots 108 in rows within the grow space without sacrificing plant site density. In some embodiments, angled growing supports 206 comprise of vertical segments and angled segments. The vertical segments contact the floor and are configured such that the width between two opposing vertical segments is just barely wide enough for a mobile robot to fit through, but narrower than the width of robot lift 112. In some embodiments, the vertical segments are connected to the grow trays via angled segments, which serve to provide enough room for robot lifts 112 to pass underneath the grow trays. In other words, in some embodiments, one or more grow tray supports are angled such that a width of a space between two angled grow tray supports on the same grow tray proximate to the grow tray is wider than a width of a space between two angled grow tray supports on the same grow tray distal to the grow tray (e.g., wider at the top near the grow tray and narrower as the support descends down toward the floor). In some embodiments, the grow trays are spaced apart just enough for robot attachment 110 to pass through.

The embodiments presented above allow for mobile robots 108 to operate in grow spaces of different configurations while maintaining high plant site densities and efficient access to plants. However, any transport related tasks in the grow space where a mobile robot 108 moves a grow tray 114 with a robot lift 112 requires that an entire row of grow trays 114 be moved to gain access. For example, a grow tray 114 in the middle of a row will collide with grow trays 114 outside of it a mobile robot 108 attempts to move it without first moving those outside grow trays 114. This means that transport operations performed on grow trays 114 that are subsets of a row are inefficient.

Figure 3A:
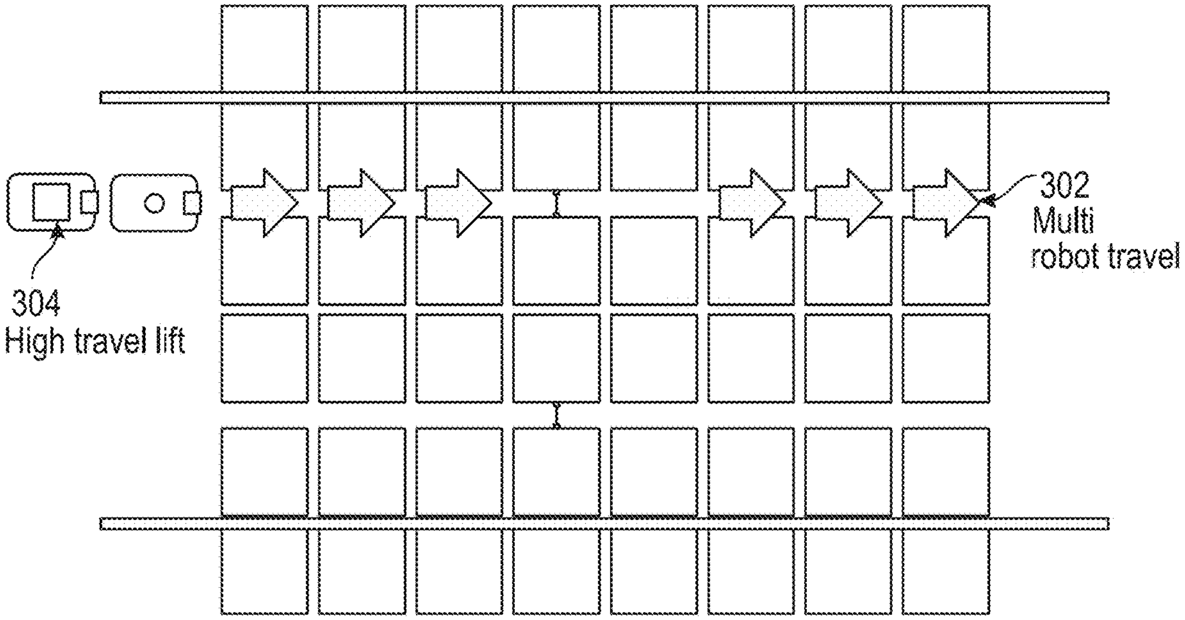
FIGS. 3A-3B illustrate yet another example of a grow space design, in accordance with one or more embodiments of the present disclosure.
Figure 3B:
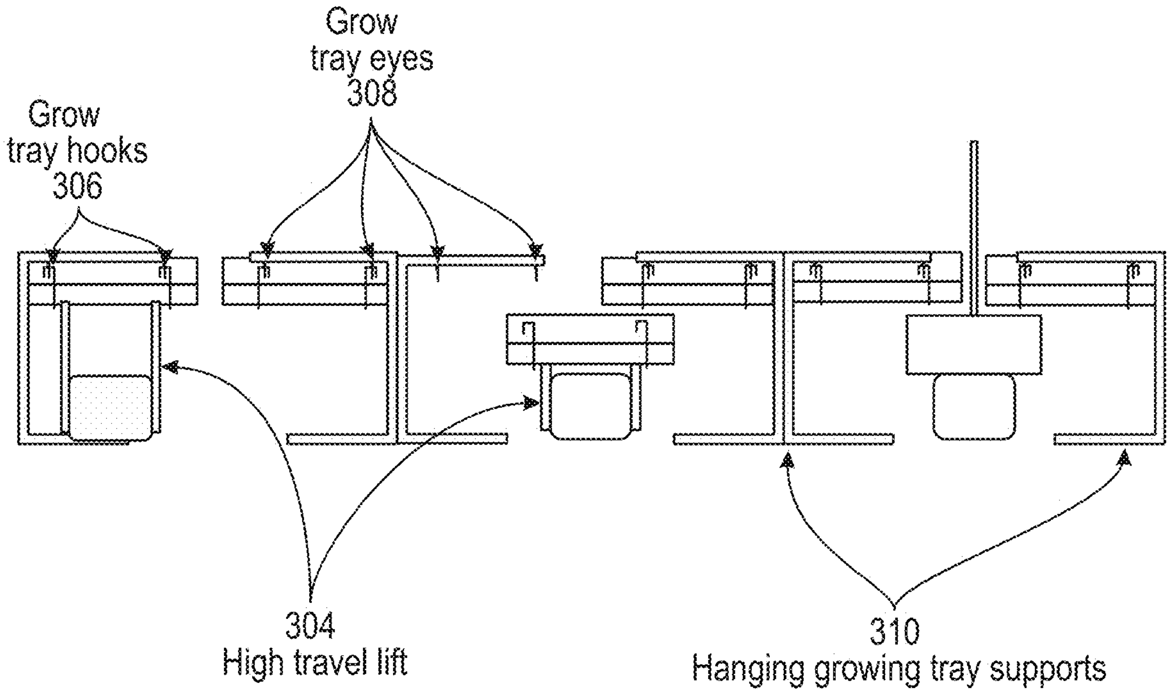

In some embodiments, to solve this problem, the embodiments shown in FIGS. 3A-3B enable random access to any grow tray 114 in a grow space by transporting grow trays 114 below the grow trays 114 in the grow space. To accomplish this, the mobile robots 108 are outfitted with a high travel lift 304 capable of moving grow trays 114 onto hanging grow tray supports 310 that are high enough to allow enough clearance for plants to be transported below grow trays 114 without collision. To move a grow tray 114, the mobile robot 108 uses the high travel lift 304 to lift up grow tray 114, which has grow tray hooks 306 attached, such that grow tray hooks 306 are centered within grow tray eyes 308. Then, mobile robot 108 moves grow tray 114 to the side slightly while raised so that grow tray hooks 306 are free of grow tray eyes 308. At this point, high travel lift 304 is lowered and mobile robot 108 moves grow tray 114 into a micro-aisle 102 where it can travel below other grow trays 114 in the grow space. In some embodiments, to place a grow tray 114 back on hanging grow tray supports 310, this process is performed in reverse order.

In some embodiments, by transporting grow trays 114 below other grow trays 114 in the grow space, it is possible to achieve efficient random access to transport any grow tray 114 with associated plants in the grow space. For mobile robots 108 with robot attachments 110 mounted, micro-aisles 102 are used to give mobile robot 108 direct access to the plants above any grow tray 114 in the grow space.

The embodiments described above with reference to FIGS. 3A-3B present one solution to achieving random access transport of grow trays 114 within a grow space. However, the embodiments require a relatively complex design for hanging grow tray supports 310 and associated alignment maneuvers for mobile robots 108, because grow tray hooks 306 must be aligned with grow tray eyes 308. For manufacturing and deployment of growing systems at scale, it may be desirable to have a less complex solution.

Figure 4:
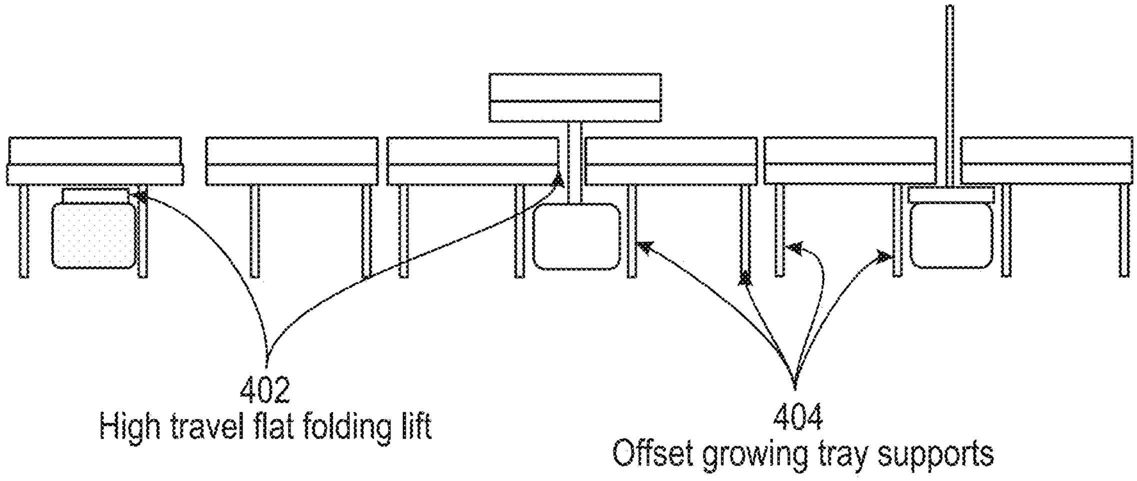
FIG. 4 illustrates yet another example of a grow space design, in accordance with one or more embodiments of the present disclosure.

The embodiment presented in FIG. 4 presents a simpler approach to random access transport of grow trays 114 by transporting some grow trays 114 above other grow trays 114 with a high travel flat folding lift 402. The high travel flat folding lift 402 lifts grow trays 114 off of grow tray supports 116 to a height tall enough to clear plants in other grow trays not being transported. In some embodiments, mobile robots 108 align with grow trays 114, lift them with a high travel flat folding lift 402, and then move them into a micro aisle 102 that has enough clearance for mobile robots 108 to travel since offset grow tray supports 404 are positioned under grow trays 114 in a shifted manner such that micro-aisles are formed every other aisle.

Some embodiments described above present solutions for transporting grow trays 114 within a grow space in a fashion that relies on growing supports 116 to have structural support for holding up grow trays 114. To reduce complexity, costs, and materials in system design and construction, it may be desirable to design grow trays 114 in conjunction with growing supports 116 such that the supports themselves can be greatly simplified.

Figure 5A:
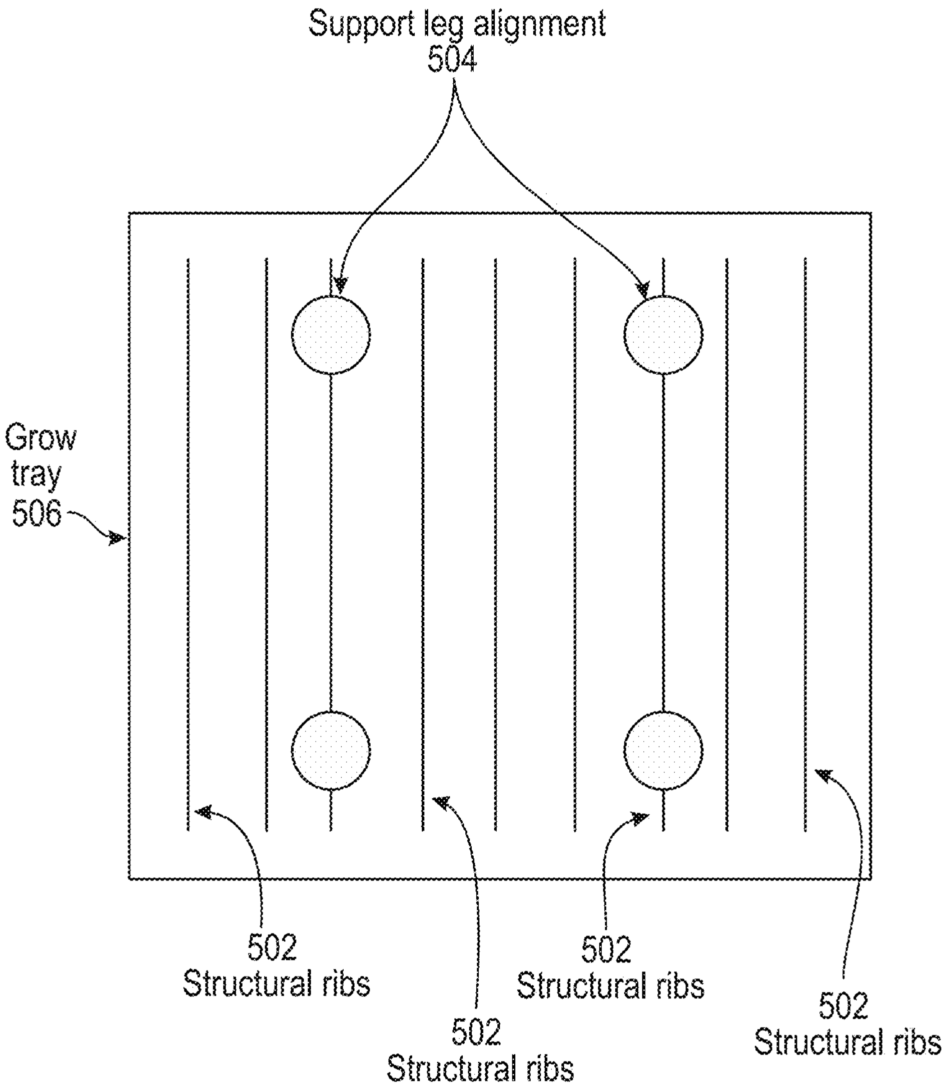
FIGS. 5A-5B illustrate an example of grow tray supports, in accordance with one or more embodiments of the present disclosure.
Figure 5B:
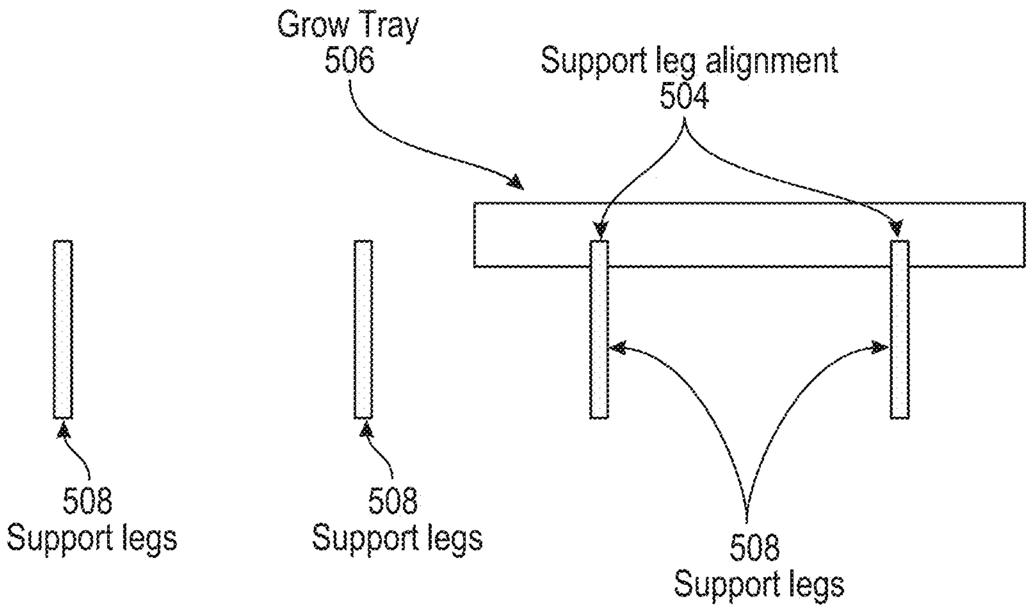

The embodiments presented in FIGS. 5A-5B replace growing supports 116 with support legs 508 and builds structural ribs 502 into the grow trays 506 themselves to ensure that grow trays 506 remain rigid even when under load. FIG. 5A is a bottom up view of the underside of a grow tray 506. Grow trays 506 also have built in structures for support leg alignment 504 that allow grow trays 506 to be placed directly on top of support legs 508 by mobile robots 108 in a grow space. This design results in grow spaces that require only support legs 508 as their fixed infrastructure which reduces costs and complexity of installation, maintenance, and operation.

In many cases, it is desirable to have multiple mobile robots 108 operating within a grow space at the same time. While these robots operate, it is important to define strategies that allow them to move throughout the grow space without colliding with or blocking each other. Defining a coordination strategy between mobile robots 108 that is simple to implement, reliable, and efficient is a challenging problem.

Figure 6A:
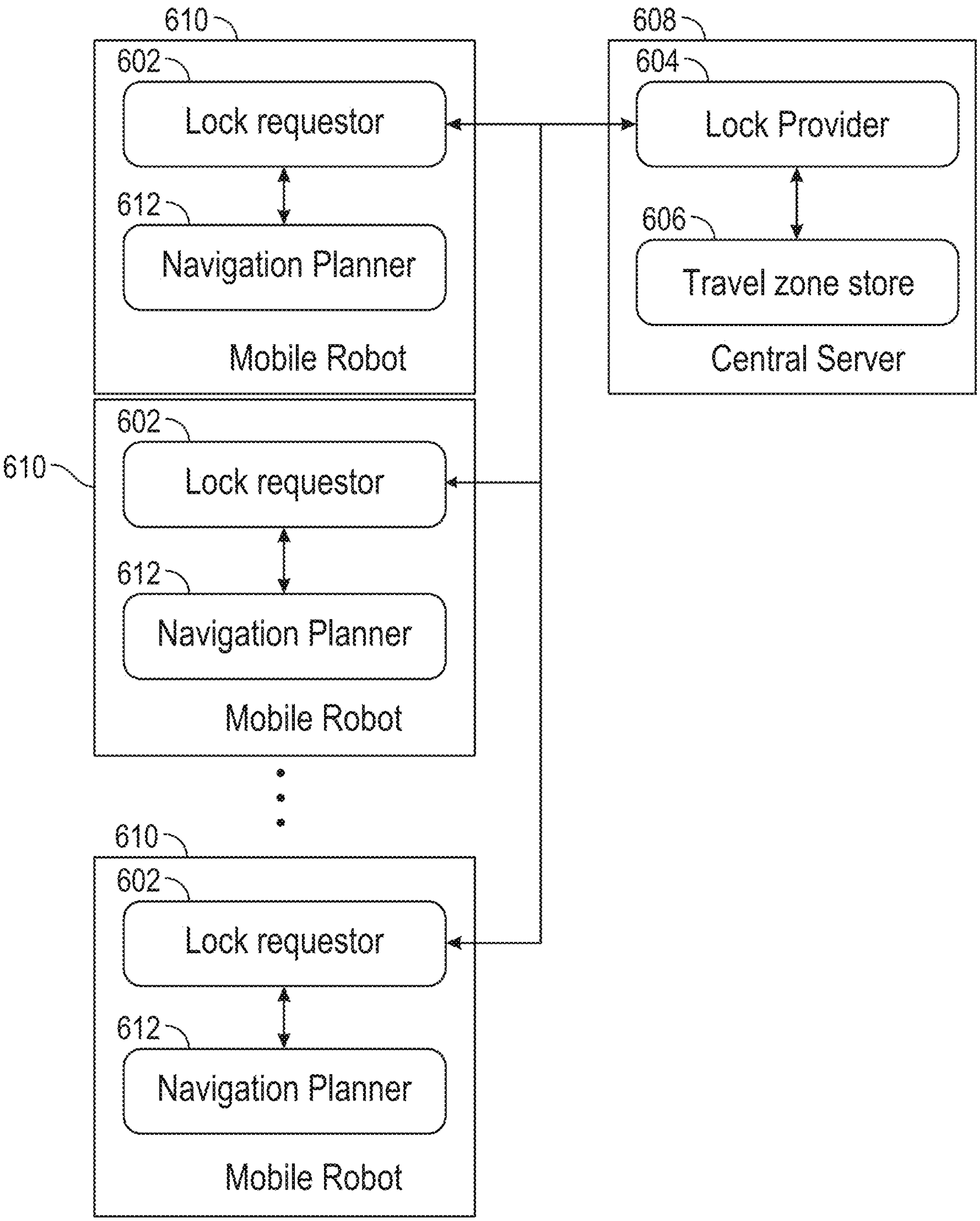
FIGS. 6A-6B illustrate an example of a multi-robot coordination design, in accordance with one or more embodiments of the present disclosure.
Figure 6B:
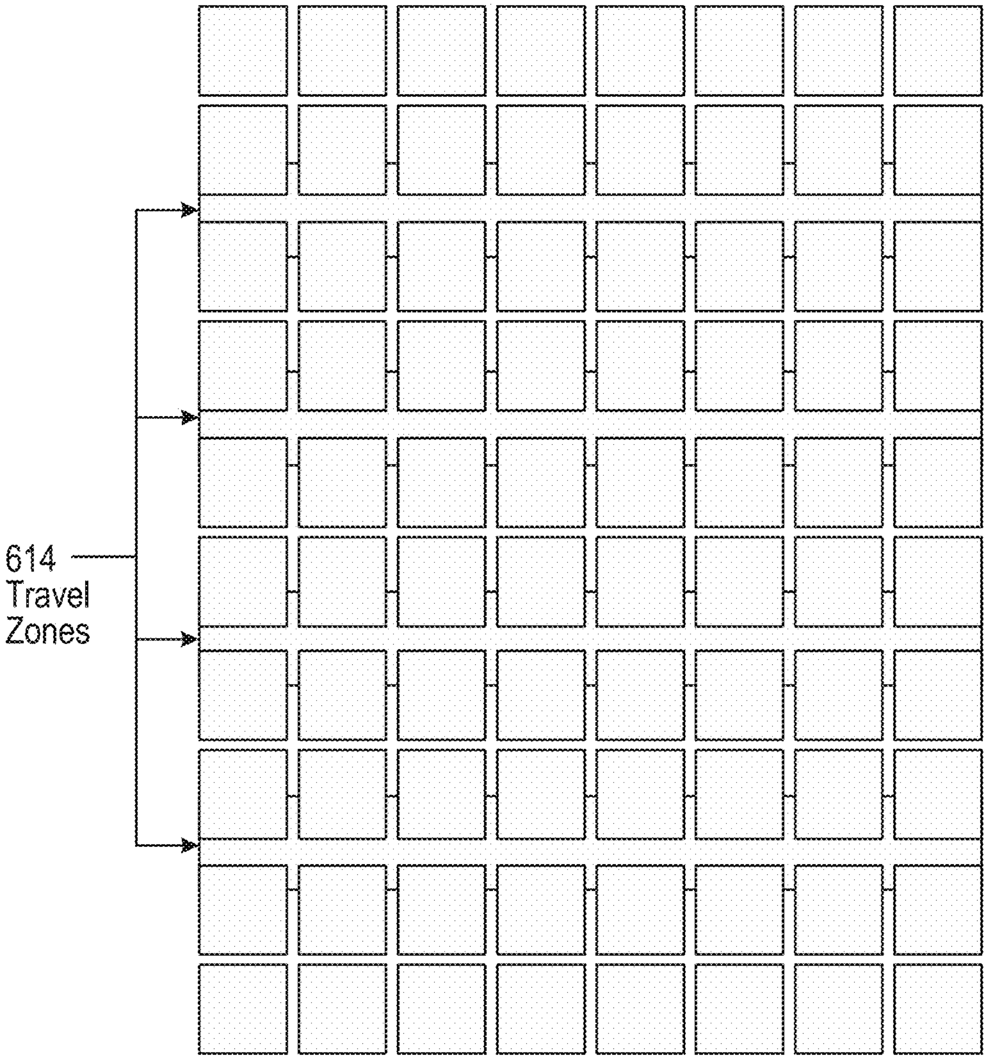

The embodiments presented in FIGS. 6A-6B present a solution to multi-robot coordination that meets these requirements. In some embodiments, a grow space is split into travel zones 614 that are represented digitally in a travel zone store 606 placed in the memory of a central server 608. In some embodiments, each mobile robot 610 is equipped with a navigation planner 612 that is responsible for planning a path for the robot through the grow space on the computer of mobile robots 610. Navigation planner 612 communicates with a lock requestor 602 component, which sends a request over the network to lock provider 608, which, in some embodiments, is software running on central server 608.

In some embodiments, each request from lock requestor 602 includes information on what travel zones 614 a mobile robot 610 associated with a lock requestor 602 plans to traverse. For each travel zone 614 in the request, lock provider 602 queries travel zone store 606 to determine whether any other robot has already made an active claim on a particular travel zone 614. If another robot is marked as active on that particular travel zone 614, then lock provider 604 passes this information to lock requestor 602 so that it can pause navigation planner 612 on the particular mobile robot 610 in question until the desired travel zone 614 is available. In some embodiments, all desired travel zones 614 in a request are available, lock provider 604 updates the travel zone store 606 and marks each travel zone 614 in the request as in use by the requesting mobile robot 610.

In some embodiments, when lock requestor 602 receives clearance from lock provider 604 to enter travel zones 614 requested by the navigation planner 612, it notifies navigation planner 612 to proceed in execution and mobile robot 610 moves to its destination. When navigation planner 612 completes this operation, it notifies lock requestor 602 to tell lock provider 604 that locked travel zones 614 are no longer needed. At this time, lock provider 604 updates travel zone store 606 to mark travel zones 614 that were previously locked as now available to other robots. After this, lock requestors 602 for any mobile robots 610 that are waiting on the lock provider 604 are then visited in order of request to determine whether any of them may proceed based on the updated state of travel zone store 606. In the case that requested travel zones 614 are now available, lock provider 604 notifies the appropriate lock requestors 602 that it is safe to proceed to navigation.

In some embodiments, when growing plants in grow spaces, it is often beneficial to ensure that plants are level in order to properly manage water volumes and nutrients that they receive. Leveling traditional hydroponic systems can be challenging because many of them sit on fixed rails or conveyors that travel large distances. One solution to this is to start with a completely level surface, but this is often impractical or impossible for large grow spaces.

Figure 7:
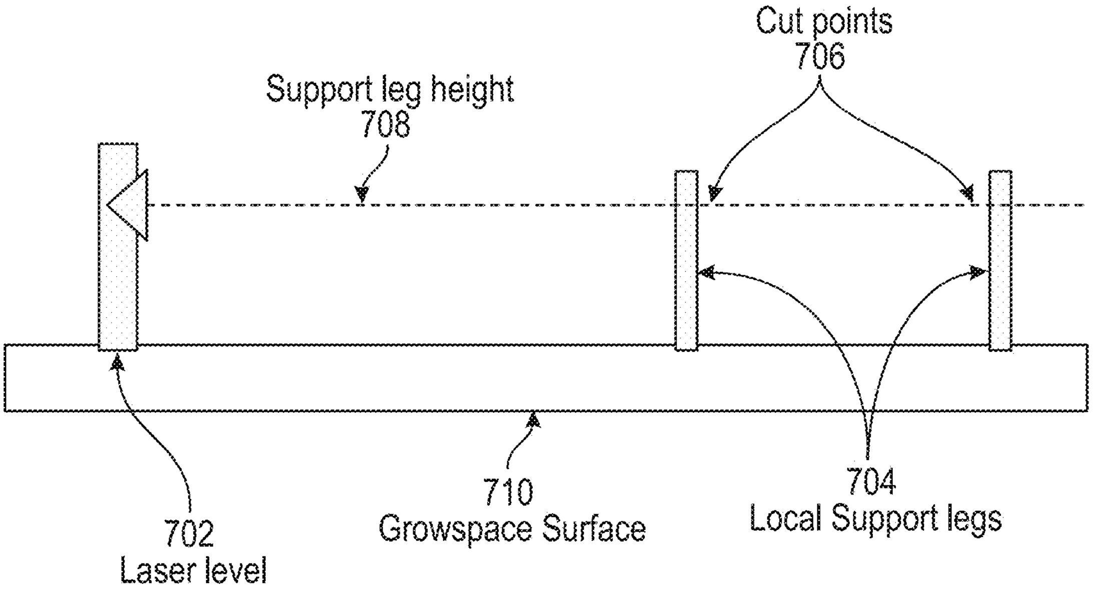
FIG. 7 illustrates an example of a grow space leveling solution, in accordance with one or more embodiments of the present disclosure.

The embodiment outlined in FIG. 7 presents a solution for leveling that uses a laser level 702 to ensure that groups of local support legs 704 are all level relative to each other independent from the global grow space surface 710, which may not be fully level. For each group of local support legs 704, laser level 702 is used to project a mark at a desired support leg height 708 onto each local support leg 704. This mark determines cut points 706 for the local support legs 704 that ensures they are level and that any grow tray 114 that rests on top of the local support legs 704 will also be level. This local leveling, combined with mobile robots 108 equipped with robot lifts 112 used for grow tray 114 transport, means the grow space automation system is also tolerant to differences in height between grow trays 114 placed throughout the grow space. As long as grow trays 114 are kept level by local support legs 704 that are within the range of heights supported by robot lift 112, all grow space automation continues to work.

In some embodiments, automation of growing operations such as seeding, transplanting, harvesting, and packaging in grow spaces has relied heavily on process automation techniques. While process automation is effective for these operations, it is also costly and requires a minimum grow space size to justify investment in specialized equipment and custom integration into the processing area of a grow space. To reduce system cost and complexity, it may be desirable to move away from dedicated machinery and actuation for each given processing task and instead move to a model where a single piece of equipment can be used for actuation across multiple tasks.

Figure 8:
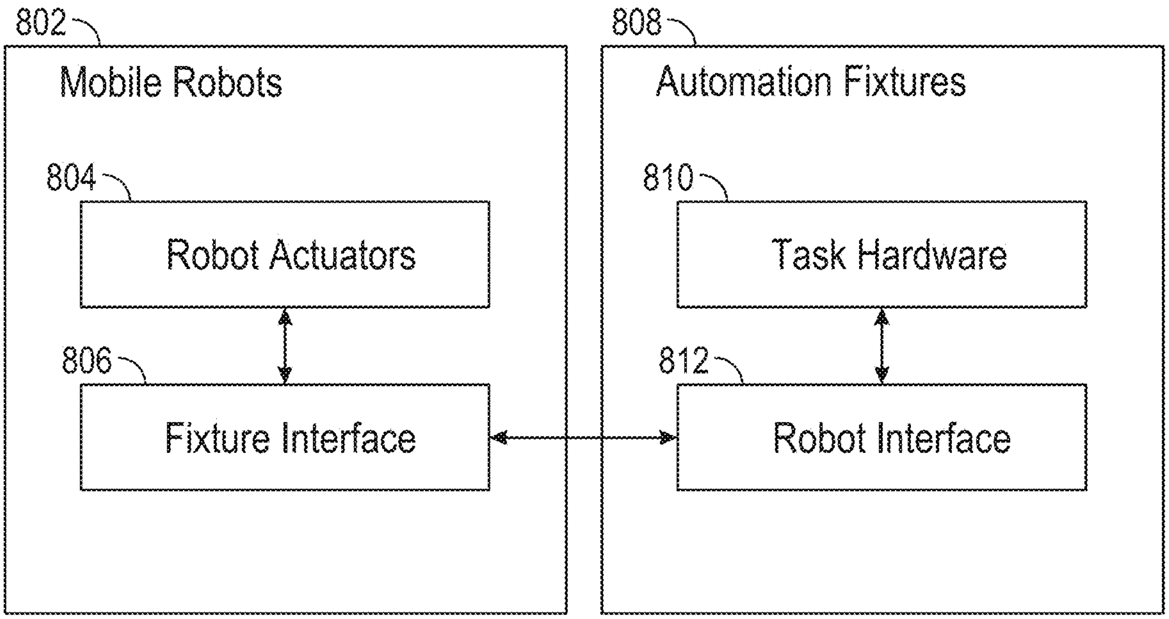
FIG. 8 illustrates an example of automation fixtures on a mobile robot, in accordance with one or more embodiments of the present disclosure.

In some embodiments, to reduce costs and deploy actuation across multiple automation tasks, the embodiment presented in FIG. 8 introduces automation fixtures 808 that have specialized task hardware 810 designed for performing plant life cycle tasks (e.g. seeding, harvesting, transplanting, etc.). In some embodiments, these tasks are coupled with a robot interface 812 that allows mobile robots 802 to provide actuation for the automation fixtures 808. In some embodiments, each mobile robot 802 is equipped with a fixture interface 806 that allows the robot actuators 804 on mobile robots 802 to couple with a robot interface 812 of any automation fixture 808 in the grow space, thereby providing the power for any dedicated task hardware 810. This design allows for automation fixtures 808 to be largely passive, and thus more cost effective than their process automation counterparts because robot actuators 804 on mobile robots 802 are able to be used as a power source.

Various embodiments described above bring grow trays and plants to a central location for processing. However, it is sometimes desirable to perform plant life cycle tasks (e.g., pruning, harvesting, etc.) in the grow space without requiring transport of grow trays 114 to save on time.

Figure 9A:
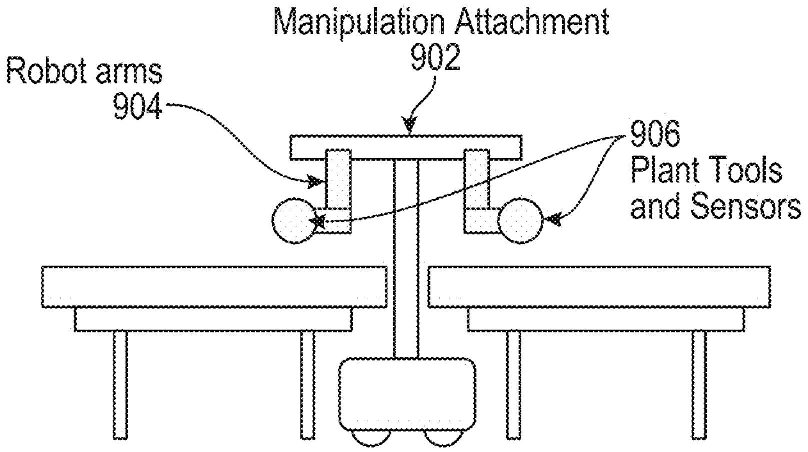
FIGS. 9A-9B illustrate examples of a manipulation attachment on a mobile robot, in accordance with one or more embodiments of the present disclosure.
Figure 9B:
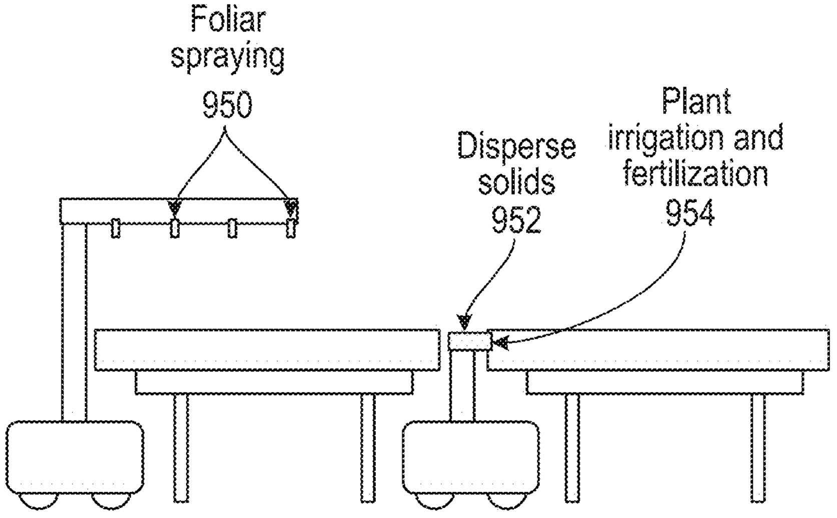

The embodiments presented in FIGS. 9A-9B allow for in place manipulation of plants in grow trays without requiring any transport. In such embodiments, a manipulation attachment 902 is added to mobile robots 108. In some embodiments, manipulation attachment 902 is equipped with robot arms 904, which are capable of positioning plant tools and sensors 906 relative to grow tray 114. Each of plant tools and sensors 906 can be used for performing different plant life cycle tasks such as pruning, picking, etc., directly in the grow space. This configuration allows for significant time savings on any plant operations that are frequently performed over the entire growing cycle versus centrally performed operations.

In some embodiments, mobile attachments 902 can be further configured to allow for the application of additives to the plants, or grow trays, using mobile robots 108. FIG. 9B shows mobile robot 108 equipped with foliar spraying attachment 950, which allows mobile robot 108 to spray liquids or gasses onto the plant canopy. Such embodiments can be used for performing plant life cycle tasks, such as applying pesticides or dosing CO2. In some embodiments, an attachment to disperse solids 952 is added to mobile robots 108, which are capable of adding solids to the plant canopy. Such embodiments can be used to disperse beneficial insects and substrates into the plant canopy. In some embodiments, an attachment for plant irrigation and fertilization 954 is added to mobile robots 108, which are capable of transferring liquids into the growing trays 114. Such embodiments can be used to irrigate plants and to add fertilizers and nutrients into the root zone of the plants.

The embodiments described with reference to FIGS. 6A-6B above outlined a distributed approach to multi-robot coordination that gives each robot control over its own navigation planning and executive level functions. In some situations, it may be desirable to achieve support for multi-robot navigation and coordination with a central arbiter to achieve higher efficiency routes and ensure optimal task planning and scheduling.

Figure 10:
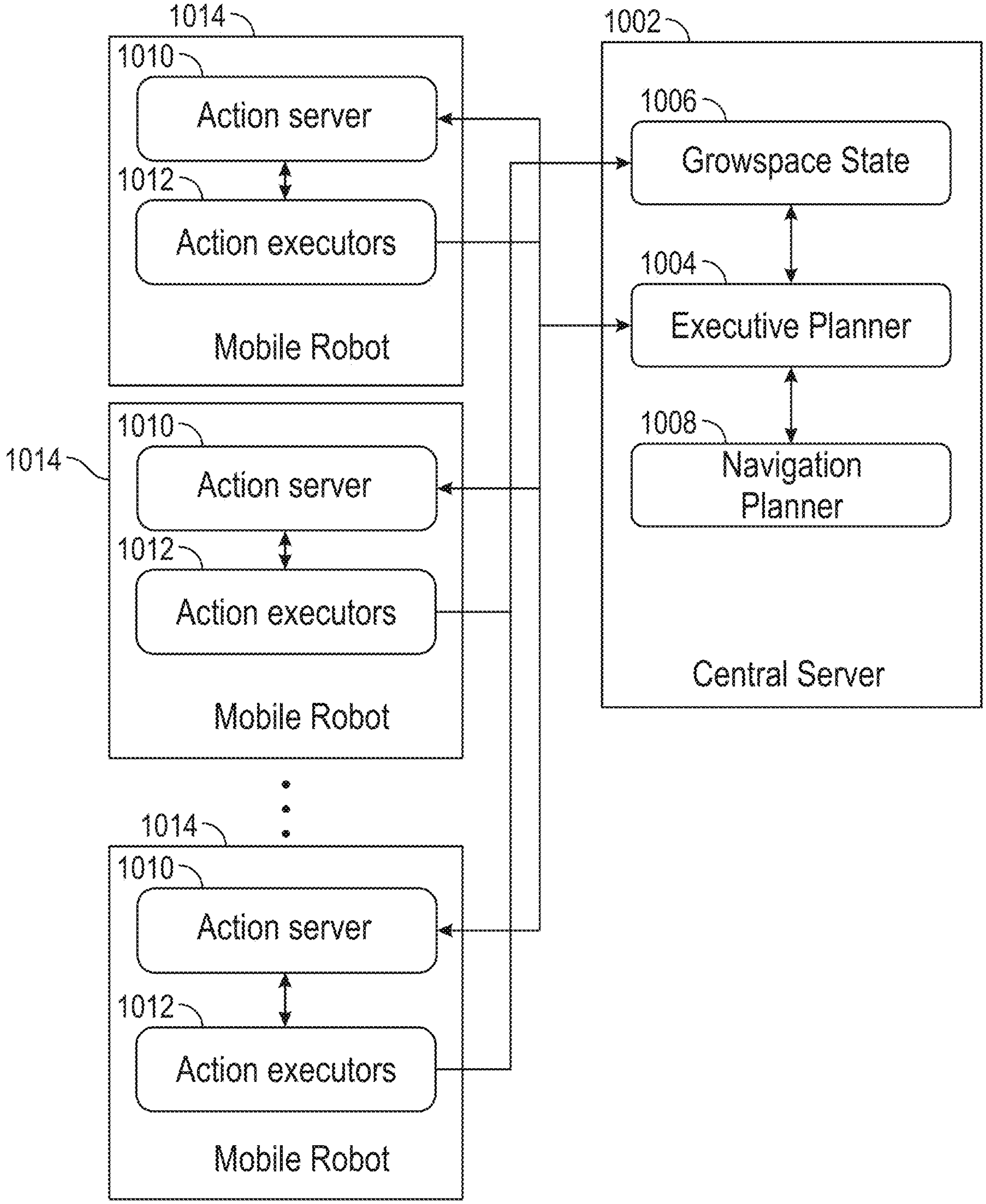
FIG. 10 illustrates an example of a multi-robot coordination with central planning design, in accordance with one or more embodiments of the present disclosure.

An embodiment presented in FIG. 10 below accomplishes this by moving the navigation planner 1008 and executive planner 1004 to a central server 1002 that also keeps track of the grow space state 1006. In some embodiments, executive planner 1004 creates an optimal set of plans for mobile robots 1014 in the grow space and tasks them with high level actions (e.g., trajectory following, spraying, fertigation, etc.) via an action server 1010 on each mobile robot 1014. In some embodiments, action server 1010 then routes a request to the appropriate action executor 1012 on mobile robot 1014. In some embodiments, action executor 1012 performs the action, e.g., trajectory following, requested by executive planner 1004 on the central server 1002. By performing planning tasks centrally, some embodiments allow executive planner 1004 on central server 1002 to have all of the information needed to create an optimal schedule and action plan for operating multiple mobile robots 1014 in the grow space.

Figure 11:
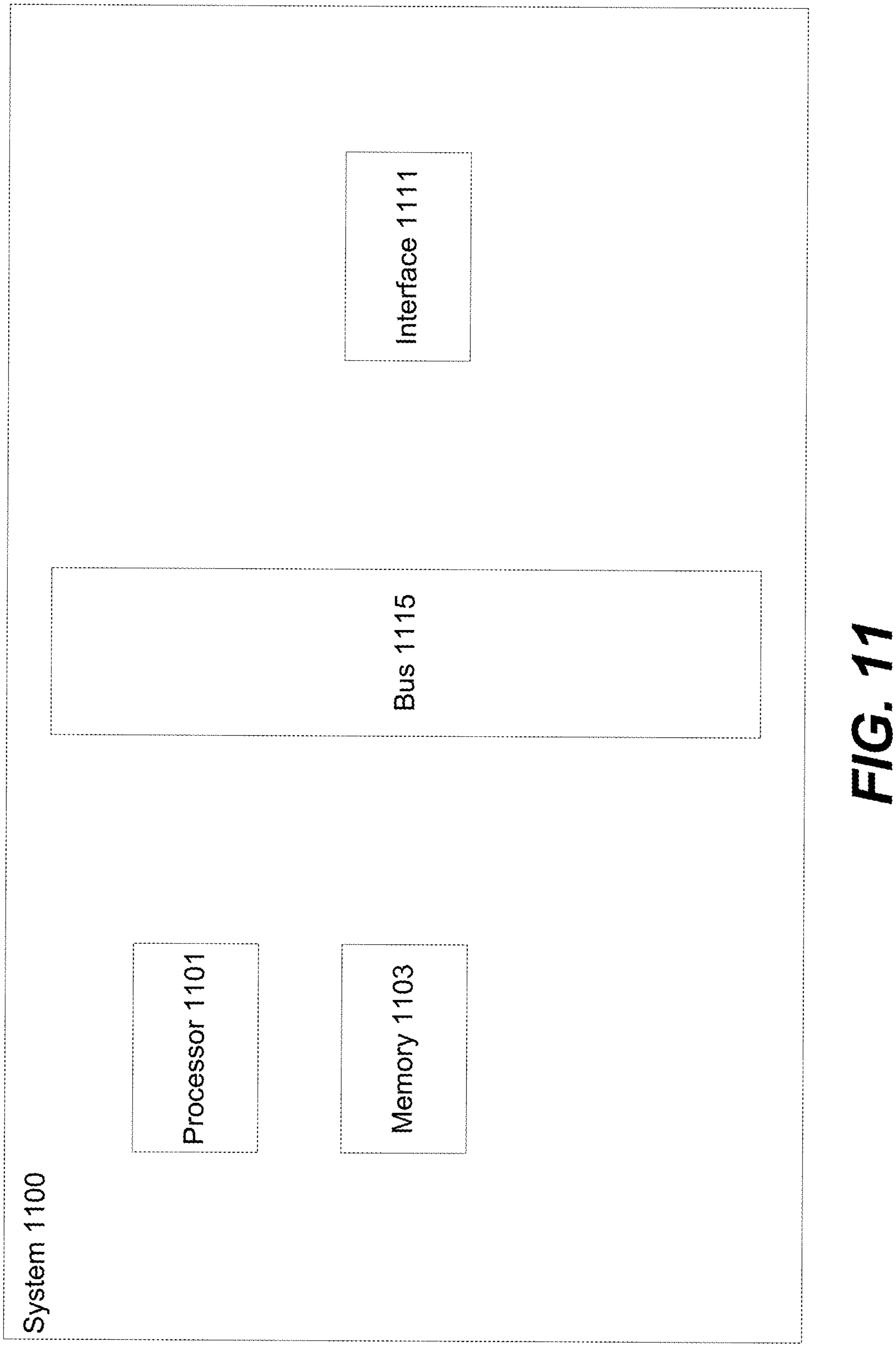
FIG. 11 illustrates an example of a computer system, configured in accordance with one or more embodiments of the present disclosure.

The examples described above present various features that utilize a computer system or a robot that includes a computer. However, embodiments of the present disclosure can include all of, or various combinations of, each of the features described above. FIG. 11 illustrates one example of a computer system, in accordance with embodiments of the present disclosure. According to particular embodiments, a system 1100 suitable for implementing particular embodiments of the present disclosure includes a processor 1101, a memory 1103, an interface 1111, and a bus 1115 (e.g., a PCI bus or other interconnection fabric). When acting under the control of appropriate software or firmware, the processor 1101 is responsible for implementing applications such as an operating system kernel, a containerized storage driver, and one or more applications. Various specially configured devices can also be used in place of a processor 1101 or in addition to processor 1101. The interface 1111 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 1100 is a computer system configured to run a control space operating system, as shown herein. In some implementations, one or more of the computer components may be virtualized. For example, a physical server may be configured in a localized or cloud environment. The physical server may implement one or more virtual server environments in which the control space operating system is executed. Although a particular computer system is described, it should be recognized that a variety of alternative configurations are possible. For example, the modules may be implemented on another device connected to the computer system.

In the foregoing specification, the present disclosure has been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure.

What is claimed is:

1. A system comprising:

a grow space including:

one or more grow trays; and one or more grow tray supports;

a mobile robot configured to perform transport or task automation within the grow space, the mobile robot including:

one or more sensors;

a mobility mechanism;

a processor;

memory; and a lift, wherein the lift is configured to allow the mobile robot to lift a grow tray off of a grow tray support and to transport the grow tray above or below a stationary height of the one or more grow trays and wherein a spacing between the one or more grow trays is larger than the lift but smaller than a width of a base of the mobile robot to allow the mobile robot to travel under the one or more grow trays and extend the lift up between the one or more grow trays to transport the grow tray above the stationary height of the one or more grow trays.

2. The system of claim 1, wherein the lift is further configured to allow transport of the grow tray at a transport height that is different from a stationary height of any other grow trays.

3. The system of claim 1, wherein the grow space is configured such that the mobile robot travels underneath columns or rows of grow trays at a transport height that is different from a stationary height of the one or more grow trays or grow tray supports.

4. The system of claim 1, wherein each grow tray is spaced apart from another grow tray with a maximum distance D, wherein D is less than the width of any particular grow tray in the one or more grow trays.

5. The system of claim 1, wherein one or more grow tray supports are angled such that the width of a space between two angled grow tray supports on a particular grow tray proximate to the particular grow tray is wider than a width of a space between two angled grow tray supports on the particular grow tray distal to the particular grow tray.

6. The system of claim 1, wherein the grow space is configured such that two mobile robots can travel side-by-side in the grow space underneath grow trays, a first mobile robot traveling directly underneath the grow trays in a column or row and a second mobile robot traveling in an aisle next to the column or row.

7. The system of claim 1, wherein the mobile robot is configured to include an attachment, the attachment being configured to perform tasks above the one or more grow trays.

8. A system comprising:

a grow space including:

a plurality of grow trays, wherein each grow tray is spaced apart from another grow tray with a maximum distance D, wherein D is less than a width of any particular grow tray in the plurality of grow trays; and one or more grow tray supports, wherein the one or more grow tray supports are configured such that a mobile robot can navigate below the plurality of grow trays while also performing tasks above the plurality of grow trays;

a mobile robot configured to perform transport or task automation within the grow space, the mobile robot including:

one or more sensors;

a mobility mechanism;

a processor;

memory; and an attachment, wherein the attachment is configured to allow the mobile robot to lift a grow tray off of a grow tray support, and wherein a spacing between the plurality of grow trays is larger than the attachment but smaller than a width of a base of the mobile robot to allow the mobile robot to travel under the plurality of grow trays and extend the attachment up between the plurality of grow trays to lift a grow tray above a stationary height of the plurality of grow trays.

9. The system of claim 8, wherein the grow space is configured such that mobile robots can travel underneath columns or rows of grow trays at a transport height that is different from a stationary height of grow trays or grow tray supports.

10. The system of claim 8, wherein one or more grow tray supports are angled such that the width of a space between two angled grow tray supports on a particular grow tray proximate to the particular grow tray is wider than a width of a space between two angled grow tray supports on the particular grow tray distal to the particular grow tray.

11. The system of claim 8, wherein the grow space is configured such that two mobile robots can travel side-by-side in the grow space underneath grow trays, a first mobile robot traveling directly underneath the grow trays in a column or row and a second mobile robot traveling in a micro-aisle next to the column or row, the micro-aisle having a width that is less than or equal to D.

12. The system of claim 8, wherein the one or more grow tray supports include hanging grow tray supports, each hanging grow tray support including one or more grow tray eyes for hanging grow trays.

13. A system comprising:

a grow space including:

one or more grow trays; and one or more travel zones within the grow space;

a plurality of mobile robots configured to perform transport or task automation within the grow space, each mobile robot including:

one or more sensors;

a mobility mechanism;

a first processor; and a first memory, wherein the first memory stores instructions for implementing:

a navigation planner, the navigation planner configured to compute a path and a list of traversable travel zones for a mobile robot to navigate within the grow space; and a lock requestor, the lock requestor configured to request locks on traversable travel zones in a given computed path from a central server; and a central server configured to manage coordination between mobile robots and travel zones within the grow space, wherein the central server includes:

a second processor; and a second memory, wherein the second memory stores instructions for implementing:

a travel zone store, the travel zone store configured to log locks of travel zones given to mobile robots; and a centralized lock provider, the lock provider configured to manage locks of travel zones to a plurality of different mobile robots.

14. The system of claim 13, wherein at least one mobile robot includes a lift configured to allow transport of the grow trays at a transport height that is different from a stationary height of any other grow trays.

15. The system of claim 13, wherein the grow space is configured such that at least one mobile robot travels underneath columns or rows of grow trays at a transport height that is different from a stationary height of grow trays or grow tray supports.

16. The system of claim 13, wherein each grow tray is spaced apart from another grow tray with a maximum distance D, wherein D is less than a width of any particular grow tray in the one or more grow trays.

17. The system of claim 13, wherein the grow space is configured such that two mobile robots can travel side-by-side in the grow space underneath grow trays in two different travel zones, a first travel zone being directly underneath the grow trays in a column or row and a second travel zone being an aisle next to the column or row.

18. The system of claim 13, wherein at least one mobile robot is configured to include an attachment, the attachment being configured to perform tasks above the plurality of grow trays.

* * * * *